United States Patent
Kurihara et al.

(10) Patent No.: US 9,690,633 B2
(45) Date of Patent: Jun. 27, 2017

(54) SYNCHRONIZATION METHOD

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Takahisa Suzuki, Kawasaki (JP); Hiromasa Yamauchi, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 317 days.

(21) Appl. No.: 13/917,188

(22) Filed: Jun. 13, 2013

(65) Prior Publication Data
US 2013/0275996 A1    Oct. 17, 2013

Related U.S. Application Data

(63) Continuation of application No. PCT/JP2010/073222, filed on Dec. 22, 2010.

(51) Int. Cl.
G06F 9/52    (2006.01)

(52) U.S. Cl.
CPC ..................... *G06F 9/52* (2013.01)

(58) Field of Classification Search
None
See application file for complete search history.

(56) References Cited

U.S. PATENT DOCUMENTS 5,978,830 A    11/1999 Nakaya et al.
6,574,725 B1 *    6/2003 Kranich et al. ............. 712/31
7,117,496 B1 *    10/2006 Ramesh et al. ............. 718/102
2004/0024909 A1    2/2004 Yumoto et al.
2009/0300646 A1 *    12/2009 Wagner ................. G06F 9/541
                                                                719/312
2011/0047556 A1    2/2011 Nishihara

FOREIGN PATENT DOCUMENTS

| JP | 7-44403 A | 2/1995 |
| JP | 10-240549 A | 9/1998 |
| JP | 2003-108392 A | 4/2003 |
| JP | 2004-5092 A | 1/2004 |
| WO | WO 2009/090964 A1 | 7/2009 |

OTHER PUBLICATIONS

International Search Report issued in PCT/JP2010/073222, mailed Feb. 15, 2011, 2 pages.

* cited by examiner

*Primary Examiner* — Meng An
*Assistant Examiner* — Michael Ayers
(74) *Attorney, Agent, or Firm* — Arent Fox LLP

(57) ABSTRACT

A synchronization method of multiple threads is executed by a computer. The synchronization method includes determining a type of a synchronization process of a first thread performing the synchronization process for synchronization with a second thread; starting time measurement when the type of the synchronization process of the first thread is a first type; performing the synchronization process of the first thread and a synchronization process of the second thread based on a synchronization process history of the second thread when the measured time exceeds a permitted response period of the first thread; and updating the permitted response period and performing the synchronization processes of the first thread and the second thread based on the synchronization process history of the second thread, when another processing request is received.

12 Claims, 13 Drawing Sheets

| THREAD NAME | SYNCHRO-NIZATION PROCESS TYPE | PERMITTED RESPONSE PERIOD [SECONDS] | SYNCHRO-NIZATION STATE FLAG |
|---|---|---|---|
| THREAD A | FAST | 10 | NO |
| THREAD B | FAST | 5 | NO |
| THREAD C | OTHER | | NO |
| THREAD D | OTHER | | NO |

302

| THREAD NAME | SYNCHRO-NIZING THREAD | SYNCHRO-NIZATION PROCESS HISTORY |
|---|---|---|
| THREAD C | THREAD A | N |
| THREAD D | THREAD B | M |

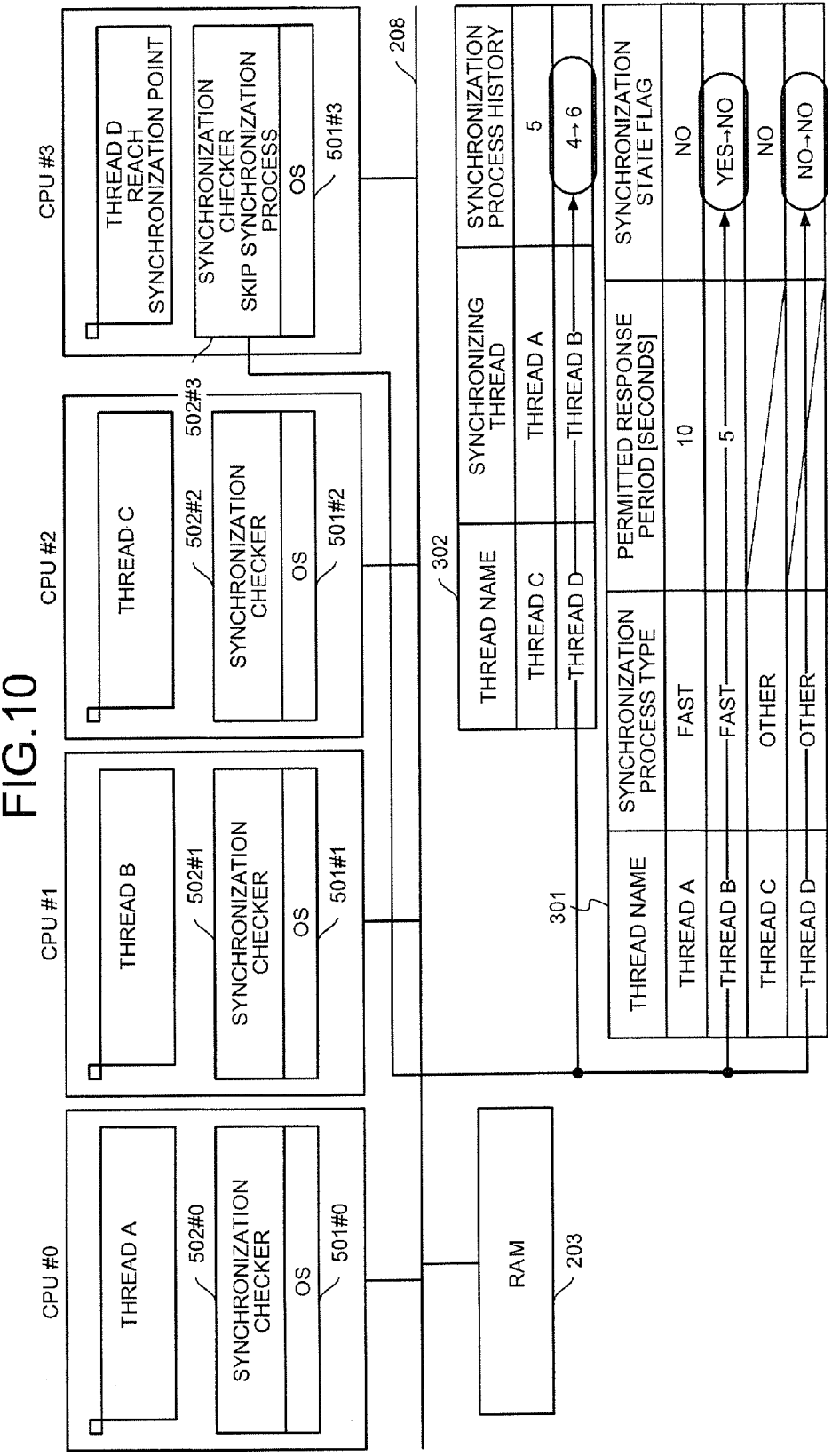

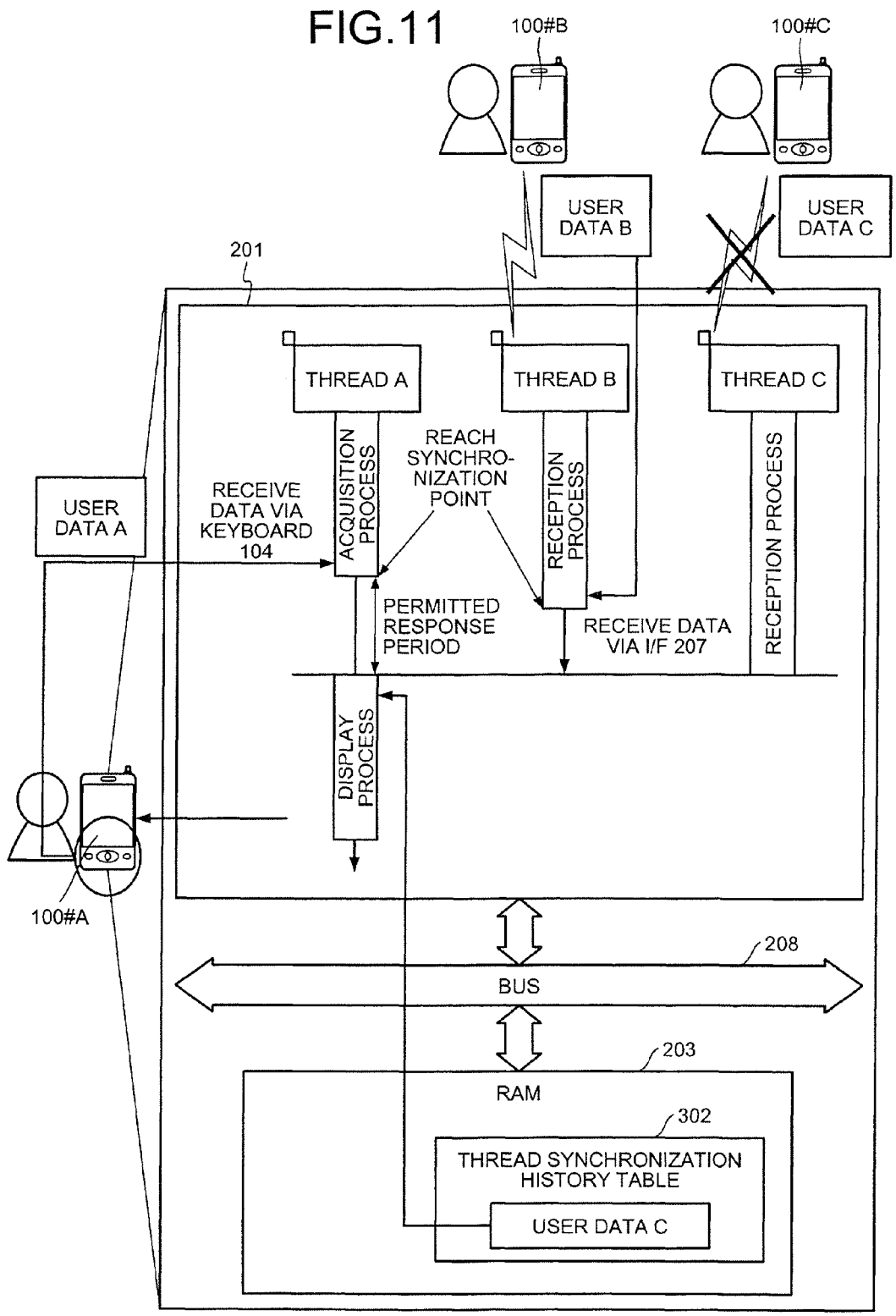

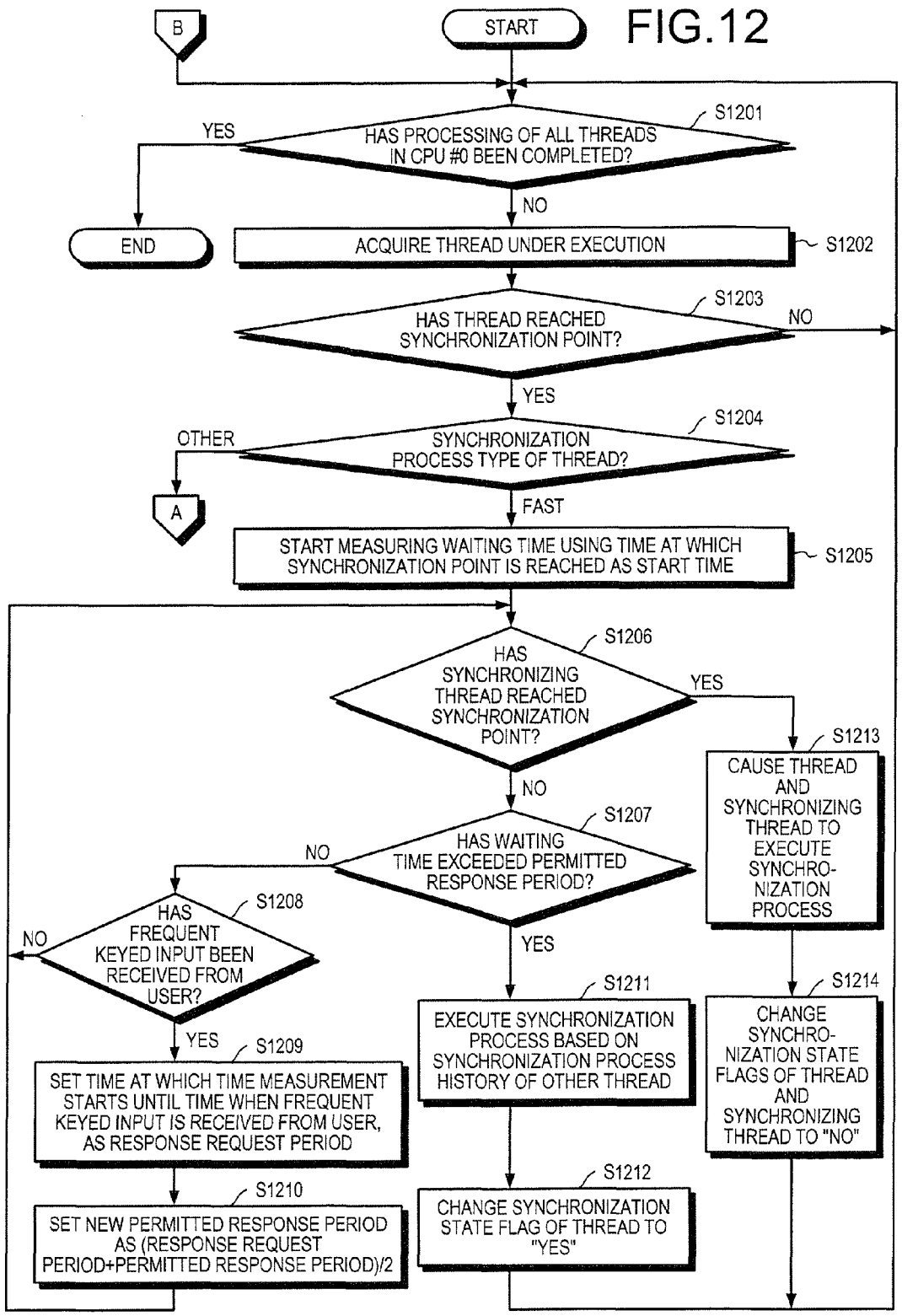

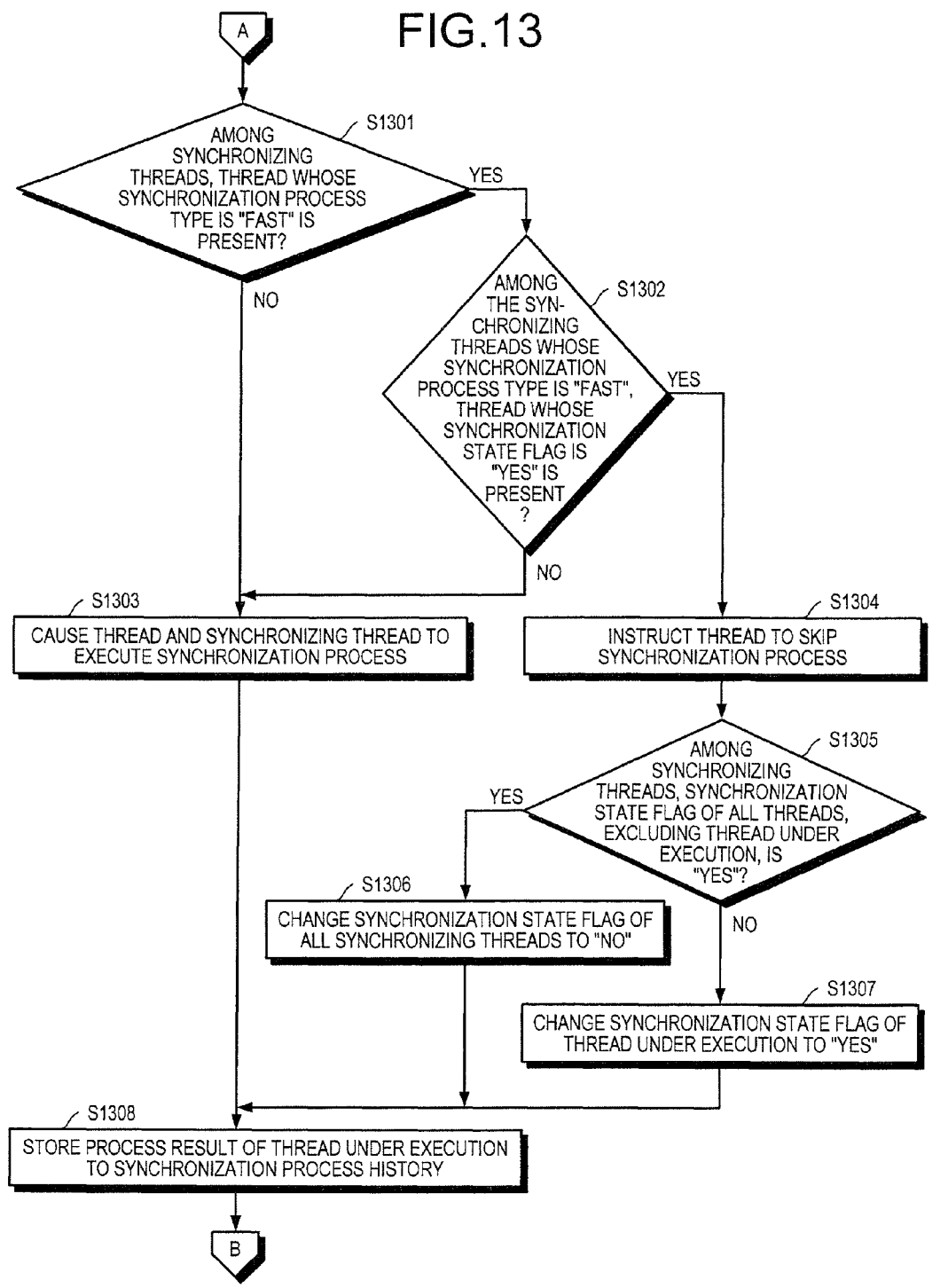

SYNCHRONIZATION METHOD

CROSS REFERENCE TO RELATED APPLICATIONS

This application is a continuation application of International Application PCT/JP2010/073222, filed on Dec. 22, 2010 and designating the U.S., the entire contents of which are incorporated herein by reference.

FIELD

The embodiment discussed herein is related to a synchronization method among threads.

BACKGROUND

Conventionally, multiprogramming technology of running multiple programs on a single central processing unit (CPU) has existed. Specifically, an operating system (OS) has a function of dividing the processing time of the CPU into intervals and by assigning the intervals to threads, enabling the CPU to simultaneously run multiple threads. Here, a thread is a unit into which a program is divided for execution. Further, multicore processor systems in which a computer system is equipped with multiple CPUs have been disclosed. Thus, with the multiprogramming technology, an OS can assign multiple threads to multiple CPUs.

Further, if a single CPU or multiple CPUs execute multiple threads in parallel, a synchronization process is performed to protect data shared between the threads. Synchronization is performed when, for example, multiple CPUs simultaneously access memory or when processing results are collected from CPUs after threads have been distributed and assigned to the CPUs.

Technology related to synchronization includes, for example, a disclosed technology that statistically records the time required for executing a portion of parallel processing and when the portion of parallel processing to be executed has a high potential of exceeding the statistical time, synchronization is assumed to have failed and the next process is assigned, thereby enabling the number of CPUs that are not executing a process to be reduced. Another technology related to synchronization has been disclosed in which synchronization levels according to information type and synchronization time intervals corresponding to the synchronization levels are stored, and the load for performing synchronization is reduced (for example, refer to Japanese Laid-Open Patent Publication Nos. H10-240549 and 2004-5092).

Nonetheless, with the conventional technologies above, for example, assuming that 2 threads are synchronized by the position of designated process code and one of the threads is a process that takes time, a problem arises in that the parallel processing is assumed to have failed and the threads are ended. Further, if the other thread continues to wait for the thread that takes time, the thread that continues to wait causes the response to the user to drop.

SUMMARY

According to an aspect of an embodiment, a synchronization method of multiple threads is executed by a computer. The synchronization method includes determining a type of a synchronization process of a first thread performing the synchronization process for synchronization with a second thread; starting time measurement when the type of the synchronization process of the first thread is a first type; performing the synchronization process of the first thread and a synchronization process of the second thread based on a synchronization process history of the second thread when the measured time exceeds a permitted response period of the first thread; and updating the permitted response period and performing the synchronization processes of the first thread and the second thread based on the synchronization process history of the second thread, when another processing request is received.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram of an example of the contents of a thread attribute table 301 and a thread synchronization history table 302;

FIG. 10 is a diagram depicting a state in which thread D reaches the synchronization point after the permitted response period elapses;

FIG. 11 is a diagram depicting an application example in a case of multiple users;

FIG. 12 is a flowchart of a first part of a process performed by the synchronization checker 502; and FIG. 13 is a flowchart of a second part of the process performed by the synchronization checker 502.

DESCRIPTION OF EMBODIMENTS

Preferred embodiments of a disclosed synchronization method will be explained with reference to the accompanying drawings. A multicore processor system having multiple CPUs will be described as an example of an information processing apparatus that executes the synchronization method according to the present embodiment. A multicore processor is a processor equipped with multiple cores. As long as multiple cores are provided, the multicore processor may be provided as a single processor equipped with multiple cores or as a group of single-core processors in parallel. For the sake of simplicity, in the present embodiment, description will be given taking a group of single-core processors as an example. Further, the information processing apparatus executing the synchronization method may be a single core.

Figure 1:
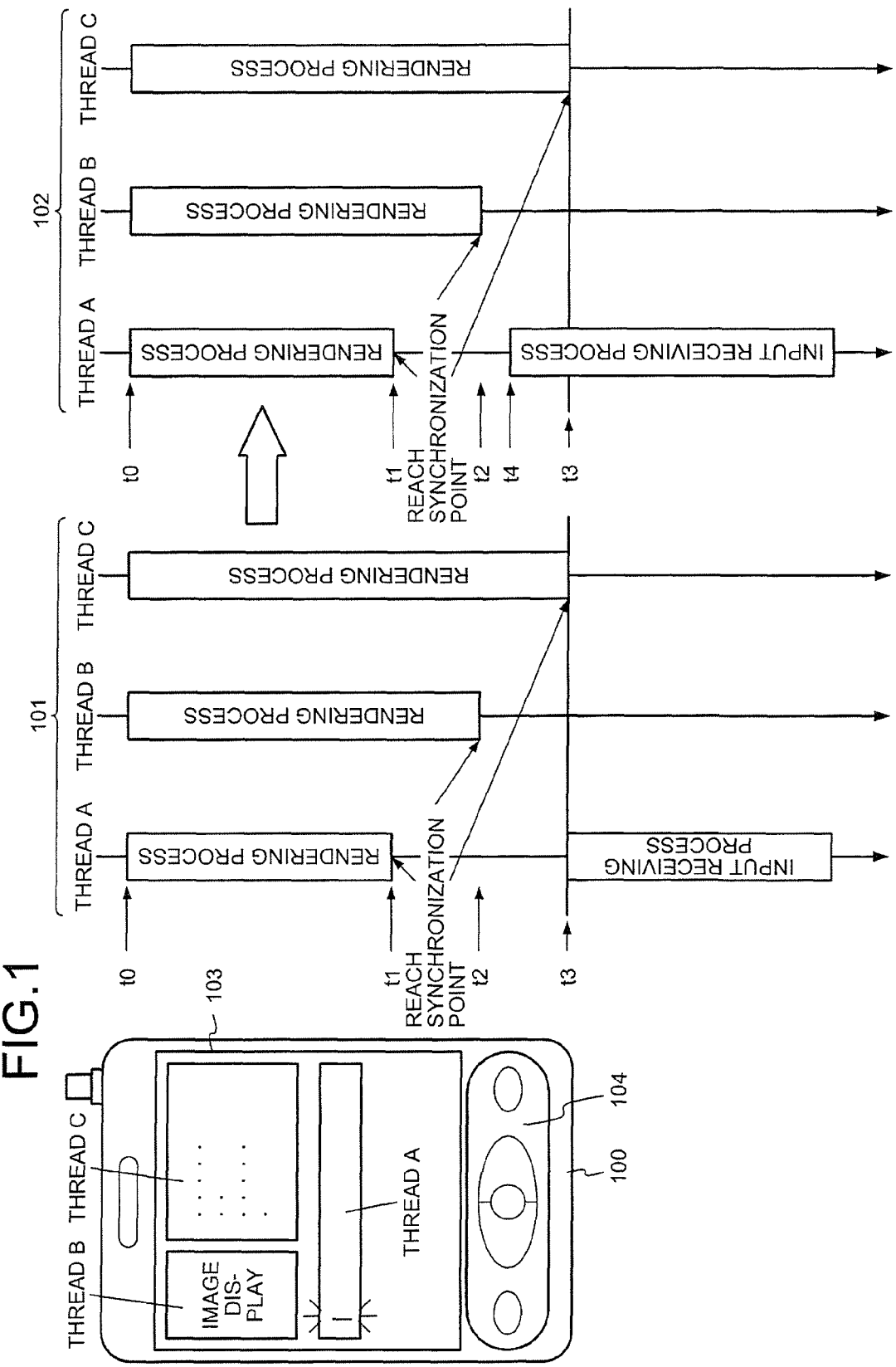
FIG. 1 is a diagram depicting operation of threads A to C in a multicore processor system 100.

FIG. 1 is a diagram depicting operation of threads A to C in a multicore processor system 100. In FIG. 1, the multicore processor system 100 having multiple CPUs is assumed to be executing a web browser. The multicore processor system 100 is assumed to be a mobile terminal, i.e., a mobile telephone. The web browser has 3 threads, including threads A, B, and C. Further, reference numeral 101 indicates operation of threads A to C in the multicore processor system 100 according to a conventional example. Reference numeral 102 indicates operation of threads A to C in the multicore processor system 100 according to the present embodiment.

The multicore processor system 100 includes, as hardware, a display 103 that displays text and images to the user and a keyboard 104 that receives input from the user. The display 103 and the keyboard 104 will be described in detail with reference to FIG. 2. Further, concerning threads A to C, thread A is a thread that receives text input from the user; thread B is a thread that displays images; and thread C is a thread that displays text.

Operation of threads A to C indicated by reference numeral 101 will be described. After receiving hypertext markup language (HTML) data, the web browser analyzes the HTML data. Consequent to the analysis, the web browser recognizes that a text input field in the HTML data, an image display portion, and a text display portion are present and invokes threads A to C at time t0. The invoked threads A to C execute rendering processes.

A rendering process is a process of generating an image to be displayed on the display 103. For example, thread A generates an image of a text input frame by a rendering process. Thread B acquires compressed image data by a link in data and generates an image expanded according an HTML image format. Thread C generates an image of text character string HTML data.

The web browser instructs threads A to C to execute a synchronization process after completion of the rendering process. For example, the developer of the web browser inserts a synchronization process into the code positioned at the end of the rendering process. The position at which the synchronization process is inserted into the code defines a synchronization point. Further, the synchronization process has a function of proceeding to the next process when all threads included in a given group have reached the synchronization point. This given group is defined as a synchronization group. During execution, when threads A to C, which belong to the same synchronization group, have all reached a synchronization point, the next process is executed.

Thus, the web browser completes all of the rendering processes of threads A to C, and at time t3 when display is possible, displays a web page on the display 103. In the example indicated by reference numeral 101, it is assumed that at time t1, the rendering process of thread A ends; at time t2, the rendering process of thread B ends; and at time t3, the rendering process of thread C ends. After the display of the web page, thread A performs a process of receiving input from the user. The process of receiving input is, for example, a process of causing the cursor to blink to indicate that input is possible and when a character string has been input consequent to operation of the keyboard 104 by the user, of performing a process of displaying the input character string.

In this manner, in the multicore processor system 100 according the conventional example, after all the rendering processes of threads A to C have been completed, the web page is displayed. If the rendering processes of thread B and C take time, the user has to continue to wait for the display of the web page. For example, a case is assumed where the multicore processor system 100 has opened the web page in the past and even though the user wants to view the web page to input text, since the web page is not displayed, the user cannot input the text and thus, has to wait.

Operation of threads A to C in the multicore processor system 100 according to the present embodiment as indicated by reference numeral 102 will be described. Threads A to C begin the rendering processes at time t0. At time t1, the rendering process of thread A ends; at time t2, the rendering process of thread B ends; and at time t3, the rendering process of thread C ends. Here, at time t4, which is between times t1 to t3, the user is assumed to frequently operate the keyboard 104. In this case, the multicore processor system 100 detects the input from the keyboard 104 and using the rendering results of thread B and past rendering results of thread C, displays the web page. After the display, thread A executes a process of receiving input.

In this manner, in the multicore processor system 100 according to the present embodiment, by expediting the thread that responds to the user, the response to the user can be improved. In the example indicated by reference numeral 102, the user can input text via the process of receiving input by thread A before the rendering process of thread C has ended, whereby the response to the user can be improved.

Even if the synchronization process of threads A to C is not performed, no serious problem arises. For example, since past rendering results of thread C are used at time t4, the rendering process results that are acquired for thread C from time t3 and thereafter may differ from the past rendering process results. However, since the objective of the user is for text input, no serious problem arises even if the past results and the current results differ. Furthermore, after the rendering process of thread C ends at time t3, the web browser may replace the past rendering results with currently obtained rendering results and display the resulting web page on the display 103.

In this manner, in the multicore processor system 100 according to the present embodiment, with respect to processing where even if synchronization is not performed, no serious problem arises, response to the user is improved by expediting the execution of the process for the user.

Figure 2:
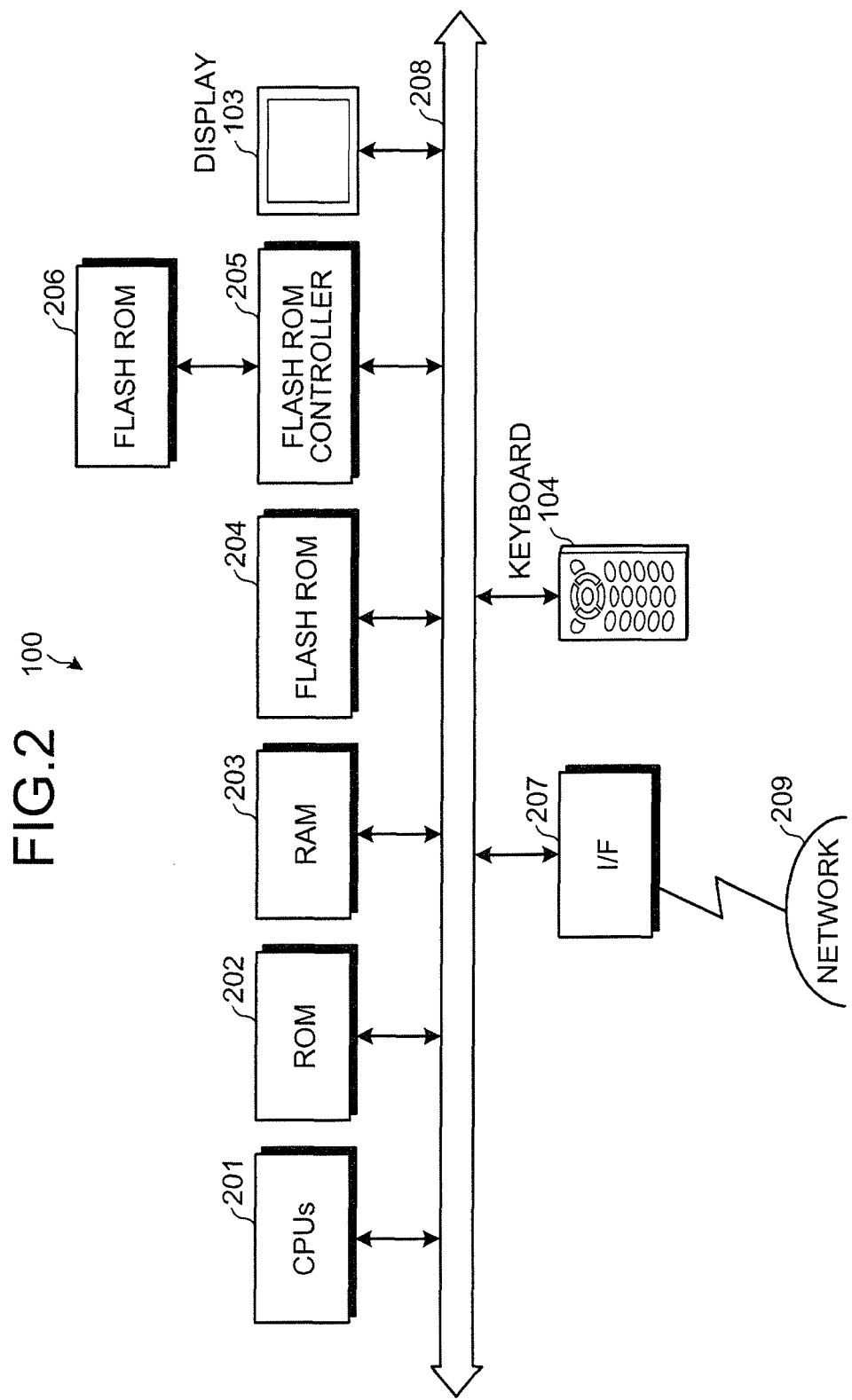
FIG. 2 is a block diagram of the hardware of the multicore processor system 100 according to the embodiment.

FIG. 2 is a block diagram of the hardware of the multicore processor system 100 according to the embodiment. In FIG. 2, the multicore processor system 100 includes multiple CPUs 201, read-only memory (ROM) 202, random access memory (RAM) 203, flash ROM 204, a flash ROM controller 205, and flash ROM 206, as well as, the display 103, an interface (I/F) 207, and the keyboard 104 as input devices for the user and other apparatuses, each component respectively connected by a bus 208.

The CPUs 201 govern overall control of the multicore processor system 100. The CPUs 201 refers to all CPUs that are single-core processors connected in parallel. Each CPU among the CPUs 201 may have a dedicated cache memory. The CPUs 201 include CPUs #0 to #N, where N is an integer of 0 or greater. In the embodiment, a single-core processor having a single CPU may be employed. If the apparatus executing the synchronization method is a single-core processor, multiprogramming is assumed by a function of the OS, etc.

The ROM 202 stores various programs such as a boot program. The RAM 203 is used as a work area of the CPUs 201. The flash ROM 204 stores system software and applications of the OS, etc. For example, if the OS is updated, the multicore processor system 100 receives the new OS via the I/F 207 and updates the old OS stored in the flash ROM 204 with the new OS.

The flash ROM controller 205, under the control of the CPUs 201, controls the reading and writing of data with respect to the flash ROM 206. The flash ROM 206 stores data written under the control of the flash ROM controller 205. Examples of the data include image data and video data acquired via the I/F 207 by the user of the multicore processor system 100. A memory card, SD card and the like can be adopted as the flash ROM 206. Further, the flash ROM 206 may store a program for executing the synchronization method.

The display 103 displays, for example, data such as text, images, functional information, etc., in addition to a cursor, icons, and/or tool boxes. A thin-film-transistor (TFT) liquid crystal display and the like may be employed as the display 103.

The I/F 207 is connected to a network 209 such as a local area network (LAN), a wide area network (WAN), and the Internet through a communication line and is connected to other apparatuses through the network 209. The I/F 207 administers an internal interface with the network 209 and controls the input and output of data with respect to external apparatuses. For example, a modem or a LAN adaptor may be employed as the I/F 207.

The keyboard 104 includes, for example, keys for inputting letters, numerals, and various instructions and performs the input of data. Alternatively, a touch-panel-type input pad or numeric keypad, etc. may be adopted.

Figure 3:
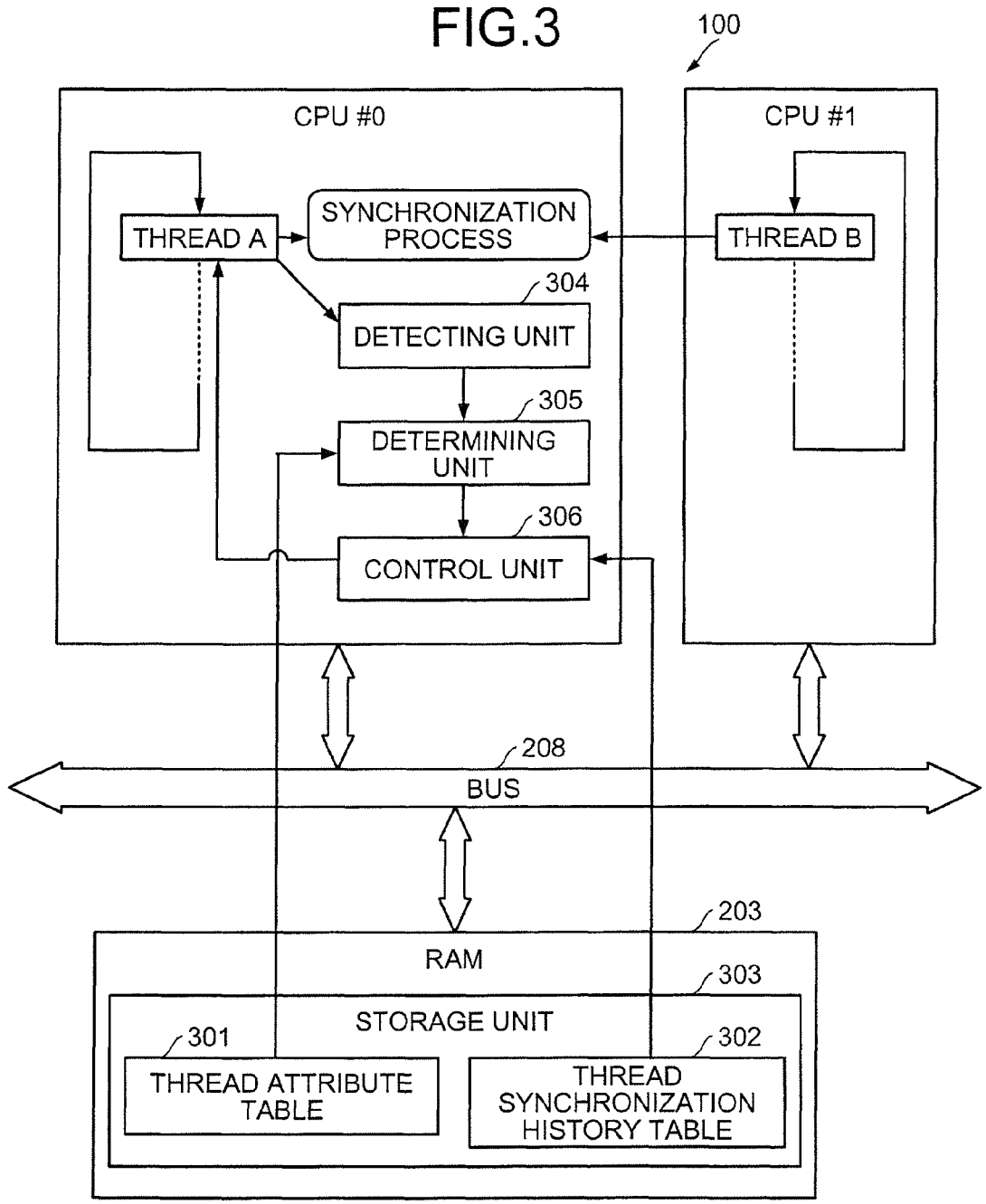
FIG. 3 is a block diagram of functions of the multicore processor system 100.

FIG. 3 is a block diagram of functions of the multicore processor system 100. The multicore processor system 100 includes a storage unit 303, a detecting unit 304, a determining unit 305, and a control unit 306. These functions (the detecting unit 304 to the control unit 306) forming a control unit are implemented by executing on a CPU #0, a program stored in a storage device. The storage device is, for example, the ROM 202, the RAM 203, the flash ROM 204, and the flash ROM 206 depicted in FIG. 2. Further, the functions may be implemented by executing a program on another CPU via the I/F 207.

In FIG. 3, although the detecting unit 304 to the control unit 306 are depicted as functions of the CPU #0, a CPU #1 to #N other than the CPU #0 may have the detecting unit 304 to the control unit 306. In the example depicted in FIG. 3, thread A is assigned to the CPU #0 and thread B is assigned to the CPU #1. Threads A and B belong to the same synchronization group and perform a synchronization process. In FIG. 3, although the storage unit 303 is depicted to have a function of the RAM 203, the storage unit 303 may have a function of another storage device such as the flash ROM 204 and the flash ROM 206.

The storage unit 303 has a function of storing the type of synchronization process of each thread among multiple threads. The types of synchronization processes include a first type that enables the thread to be executed before the threads reach the synchronization point and a second type that causes the thread to wait until the threads reach the synchronization point. For example, the storage unit 303 stores the type of synchronization process of each thread in a thread attribute table 301.

The storage unit 303 stores the process history for the time when a thread executes the synchronization process. For example, the storage unit 303 stores to a thread synchronization history table 302, as the process history, the results of executing process at the time when the thread executes the synchronization process. The contents of the thread attribute table 301 and the thread synchronization history table 302 will be described with reference to FIG. 4.

The detecting unit 304 has a function of detecting that a given thread among threads that perform the synchronization process multiple times has reached a synchronization point that is the position of process code that executes the synchronization process. A state in which a thread has reached a synchronization point indicates a state in which a program counter of a thread indicates the start point of executing synchronization process. For example, the detecting unit 304 detects that thread A has reached the synchronization point. Information indicating detection is stored to a storage area such as that of the RAM 203, the flash ROM 204, and the flash ROM 206.

The determining unit 305 has a function of determining based on the synchronization process types stored in the storage unit 303, the type of the synchronization process of the given thread if the given thread has been detected to have reached the synchronization point by the detecting unit 304. For example, if the type of the synchronization process of thread A is indicated in the thread attribute table 301 to be the first type, the determining unit 305 identifies the type of the synchronization process of thread A to be the first type. The identified synchronization process type is stored to a storage area such as that of the RAM 203, the flash ROM 204, and the flash ROM 206.

After the given thread has been detected to have reached the synchronization point by the detecting unit 304, the determining unit 305 may determine whether a permitted response period corresponding to the given thread has been exceeded. For example, assuming that the type of the synchronization process of thread A is the first type and the permitted response period is 10 [seconds], the determining unit 305 determines that 10 [seconds] have elapsed since the time at which thread A reached the synchronization point. Information indicating whether the permitted response period has been exceeded is stored to a storage area such as that of the RAM 203, the flash ROM 204, and the flash ROM 206.

The determining unit 305 may determine whether a process other than a process of the concerned thread has been requested. For example, if an input count per unit time from the keyboard 104 has exceeded a given value, the determining unit 305 may determine that the user has requested a process other than a process of the concerned thread. Although not depicted in FIG. 2, if the multicore processor system 100 has an input interface other than the keyboard 104, the determining unit 305 determines that a process has been requested by the user based on an input count from the input interface.

For example, if the multicore processor system 100 has a gyro sensor capable of detecting the incline of an object, the determining unit 305 may determine that the user has requested a process if a change in the incline of the object is intense.

If the user requests executing a process in a state in which the synchronization process is not being performed, the determining unit 305 may determine whether the permitted response period updated at the time of the processing request from the user has been exceeded. For example, assuming the type of the synchronization process of thread A is the first type, the permitted response period is 10 [seconds], and the user requests executing a process 6 [seconds] after the time at which thread A reaches the synchronization point, in this case, if the updated permitted response period is 8 [seconds], the determining unit 305 determines that 8 [seconds] have elapsed since thread A reached the synchronization point.

A method of updating the permitted response period suffices to be one that shortens the permitted response period. For example, the multicore processor system 100 takes the arithmetic average of the permitted response period (10 [seconds]) and the time that elapses until the processing request is received from the user (6 [seconds]) (8 [seconds]) as the updated permitted response period.

The control unit 306 has a function of causing the given thread to execute the synchronization process based on the process history of another thread that is among the threads and has not reached the synchronization point, if the type of the synchronization process of the given thread has been determined to be the first type by the determining unit 305. The process history is the process result at the time when the other thread executed the synchronization process before the time at which the given thread reached the synchronization point. For example, based on the process history of thread B (the other thread), the control unit 306 causes thread A, whose synchronization process type is the first type, to execute the synchronization process.

The control unit 306 may cause the given thread to execute the synchronization process based on the process history of the other thread, if the type of the synchronization process of the given thread is the first type and the permitted response time for the given thread has been determined to be exceeded since the detection of the given thread reaching the synchronization point. If the permitted response period has been updated and the updated permitted response period has been determined to have been exceeded since the detection of the given thread reaching the synchronization point, the control unit 306 may cause the given thread to execute the Synchronization process based on the process history of the other thread.

FIG. 4 is a diagram of an example of the contents of the thread attribute table 301 and the thread synchronization history table 302. The thread attribute table 301 has 4 fields respectively for thread names, synchronization process types, permitted response periods, and synchronization state flags. The thread name field stores information that can uniquely identify a thread such as the name or identification (ID) of the concerned thread.

The synchronization process type field stores the type of the process method of a synchronization process. The stored value is one of 2 types, "fast" or "other". "fast", which corresponds to the first type, indicates that the concerned thread is a thread that even if the thread does not perform the synchronization process, has few consequent problems and is a thread that affects the response to the user. "other", which corresponds to the second type, indicates that the concerned thread is a thread other than a "fast" thread.

A thread that has few consequent problems if the synchronization process is not performed is a thread that, for example, collects rendering process results. A thread that affects the response to the user is a thread that, for example, receives input from the keyboard 104 or that causes display on the display 103. At the time of design, the designer sets for each of the threads, whether the thread satisfies such predetermined conditions.

The permitted response period field stores a threshold of a period that is permitted until execution of a response process for the user. If the concerned thread for which "fast" is indicated in the synchronization process type field reaches the synchronization point and the period set in the permitted response period field has been exceeded, the concerned thread performs the synchronization process with the past process history of another thread. The value set in the permitted response period field may be a value set based on application program specifications, or a value set based on the operation history of the user.

The synchronization state flag field indicates whether the concerned thread has performed the synchronization process. The stored value is one of 2 values, "NO" or "YES". "NO" is the initial state and indicates that the concerned thread has not yet performed the synchronization process. "YES" indicates that the concerned thread has already performed the synchronization process.

For example, thread A depicted in FIG. 4 is a thread whose synchronization process type is "fast" indicating that the thread has few problems even if the synchronization process is not performed and the thread affects the response to the user. Further, thread A has a permitted response period of 10 [seconds] and has not yet performed the synchronization process. Similarly, thread B is a thread whose synchronization process type is "fast", has a permitted response period of 5 [seconds], and has not yet performed the synchronization process. Threads C and D are threads whose synchronization process type is "other" and have not yet performed the synchronization process.

The thread synchronization history table 302 has 3 fields respectively for thread names, synchronizing thread names, and synchronization process histories. The thread name field stores information that can uniquely identify a thread, such as the name or identification (ID) of the concerned thread. The synchronizing thread name field stores the name of each thread performing the synchronized process with the concerned thread, For example, in FIG. 4, threads C and A belong to the same synchronization group and perform the synchronization process. Similarly, threads D and B belong to the same synchronization group and perform the synchronization process.

The number of threads included in a synchronization group may be 3 or more. In this case, the synchronizing thread name field stores among the same synchronization group, the other threads excluding the concerned thread. For example, if threads A, C, and E belong to the synchronization group, the synchronizing thread name field of thread A stores thread C and thread E.

The synchronization process history field stores process results for the time when the concerned thread reached the synchronization point. For example, if the process result is a value N when thread C reaches the synchronization point, the synchronization process history field stores the value N. Further, if the process result is an image, a pointer to the stored image is stored in the synchronization process history field.

The multicore processor system 100 accesses the thread attribute table 301 and the thread synchronization history table 302, and performs the synchronization process. With reference to FIGS. 5 to 10, transition of processing threads A to D under execution in the multicore processor system 100 will be described together with values in the thread attribute table 301 and the thread synchronization history table 302.

Figure 5:
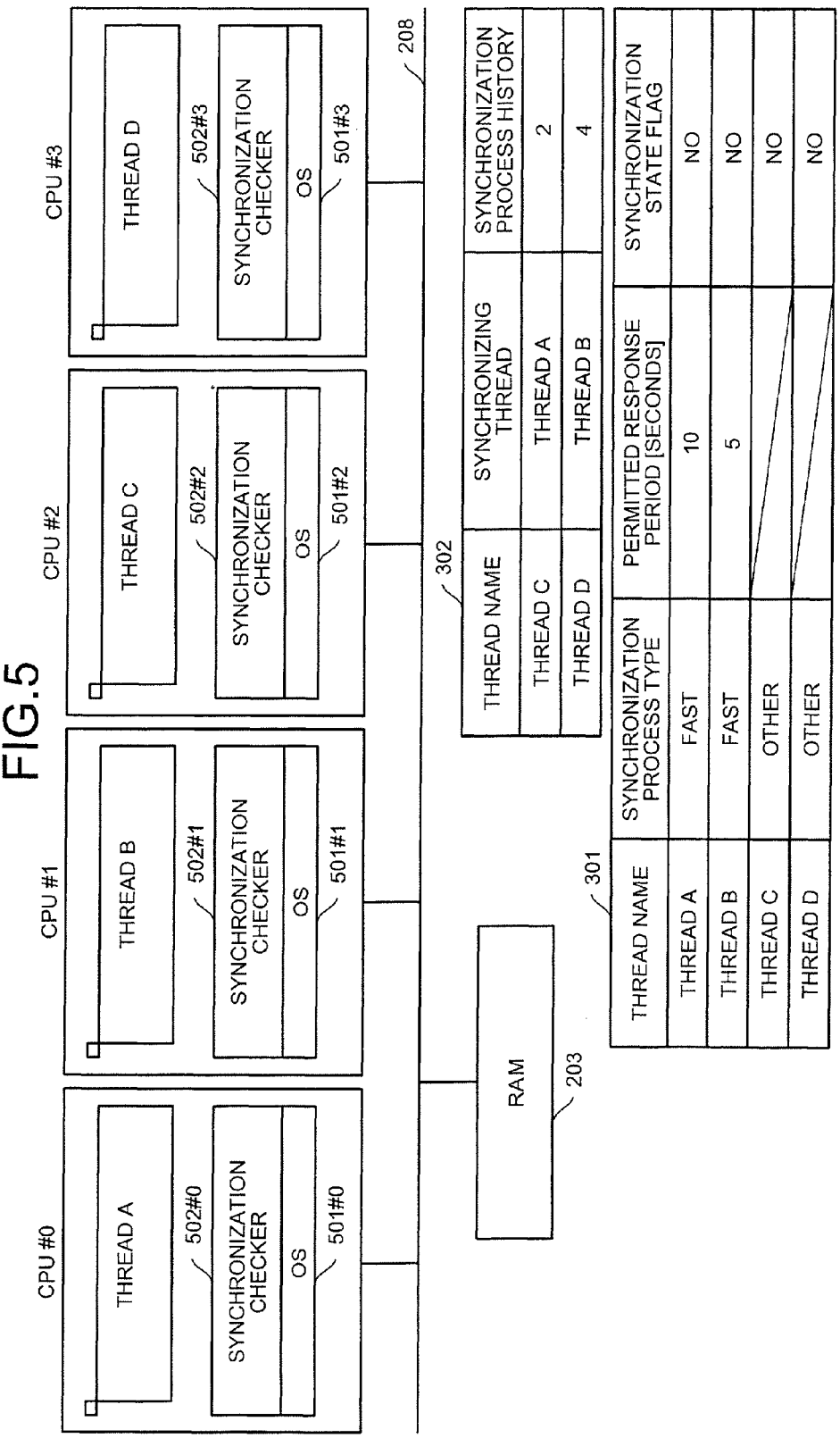
FIG. 5 is a diagram depicting a state in which execution of threads A to D has started.

FIG. 5 is a diagram depicting a state in which execution of threads A to D has started. The CPUs #0 to #3 among the CPUs 201 depicted in FIG. 5 are executing OSs 501#0 to the OS 501#3 and the CPUs #0 to #3 are further executing synchronization checkers 502#0 to 502#3 that monitor the synchronization process. Schedulers in the OSs 501#0 to 501#3 assign threads A to D to the CPUs #0 to #3. The data in the thread attribute table 301 and the thread synchronization history table 302, with the exception of the synchronization process history field is equivalent to that depicted in FIG. 4 and thus, further description is omitted.

The synchronization process history field in FIG. 5 stores "2" as the synchronization process history of thread C and "4" as the synchronization process history of thread D. These values are the process results of threads C and D at the time when threads C and D reached the synchronization point at the previous execution of the synchronization process. The initial value of the synchronization process history field may be an initial value stored by the designer or may be left blank.

Figure 6:
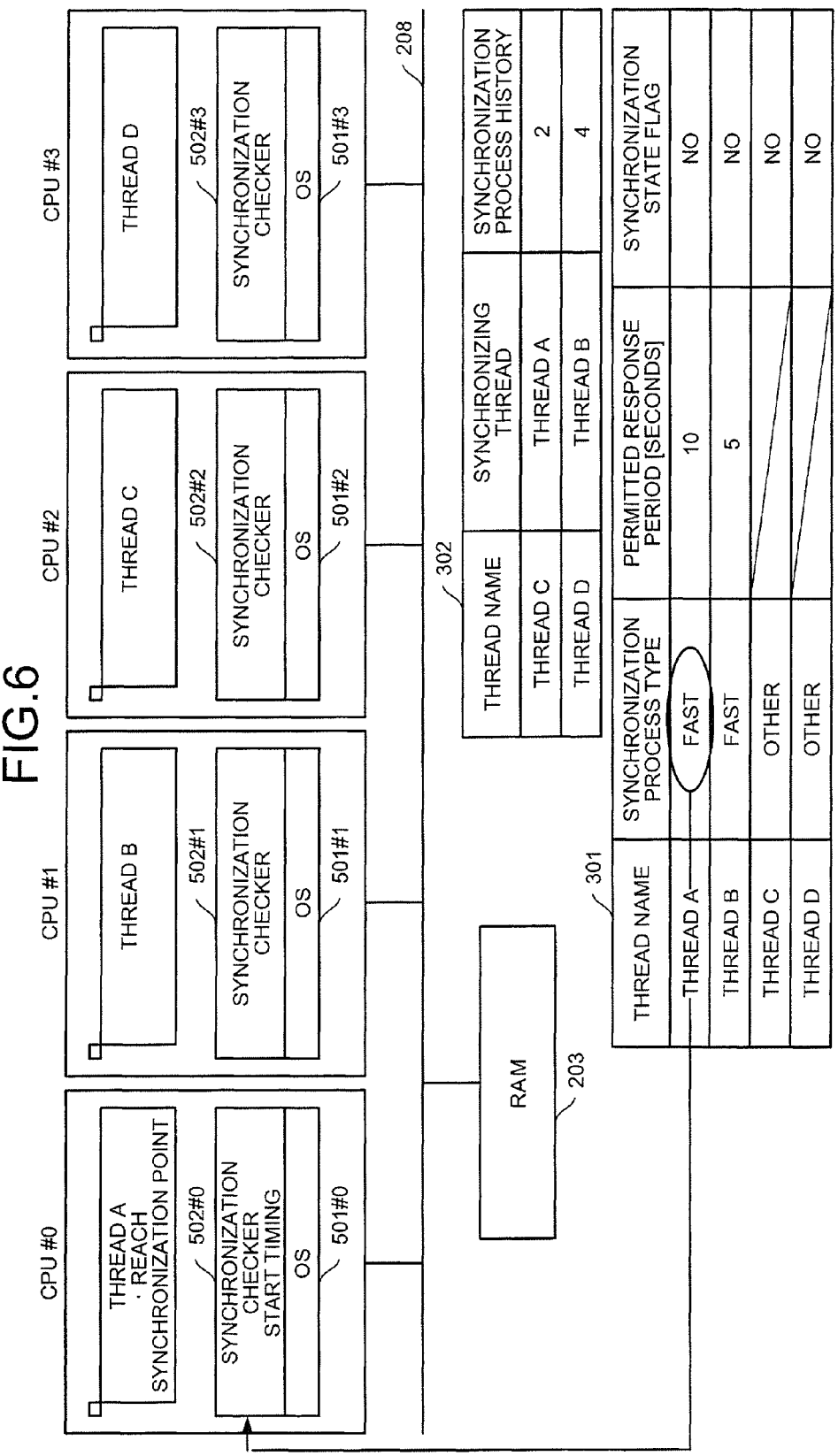
FIG. 6 is a diagram depicting a state in which thread A has reached a synchronization point.

FIG. 6 is a diagram depicting a state in which thread A has reached the synchronization point. When thread A reaches the synchronization point, the synchronization checker 502#0 accesses the thread attribute table 301 and determines the synchronization process type of thread A. The synchronization process type of thread A is "fast" and therefore, thread A is a thread that even if the synchronization process is not performed, has few problems and that affects the response to the user. Consequently, if the synchronization process has not be performed even though the permitted response period of 10 [seconds] has elapsed since the time that thread A reaches the synchronization point, the execution of thread A is expedited. To determine whether the permitted response period has elapsed, the synchronization checker 502#0 begins measuring the time.

Figure 7:
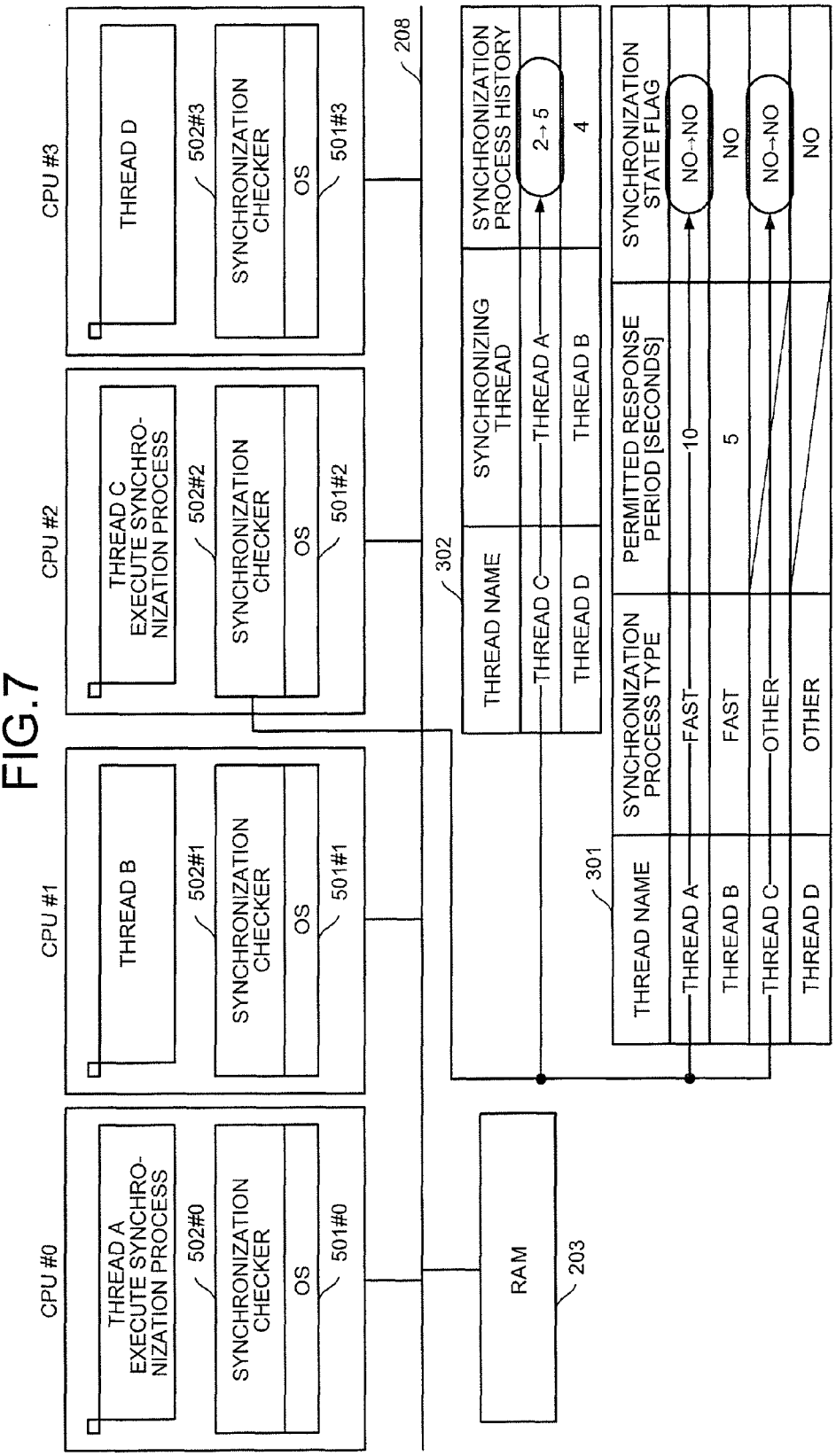
FIG. 7 is a diagram depicting a state in which thread C has reached the synchronization point within a permitted response period.

FIG. 7 is a diagram depicting a state in which thread C has reached the synchronization point within the permitted response period. FIG. 7 depicts a case in which thread C has reached the synchronization point within the permitted response period of 10 [seconds] of thread A. The synchronization checker 502#2 checks the synchronization flag of thread A, which is the synchronize thread of thread C. In the example depicted in FIG. 7, since thread C has reached the synchronization point within the permitted response period, the synchronization state flag thread A is still "NO". Having confirmed that the synchronizing thread has not yet performed the synchronization process, the synchronization checker 502#2 causes threads A and C to normally execute the synchronization process.

After completion of the synchronization process, the synchronization checker 502#2 sets the synchronization state flag of thread A and the synchronization state flag of thread C to "NO" in preparation for the next execution of the synchronization process. Further, the synchronization checker 502#2 updates the synchronization process history of thread C. In the example depicted in FIG. 7, the process result of thread C is "5" and therefore, the synchronization process history of thread C is set to "5".

Figure 8:
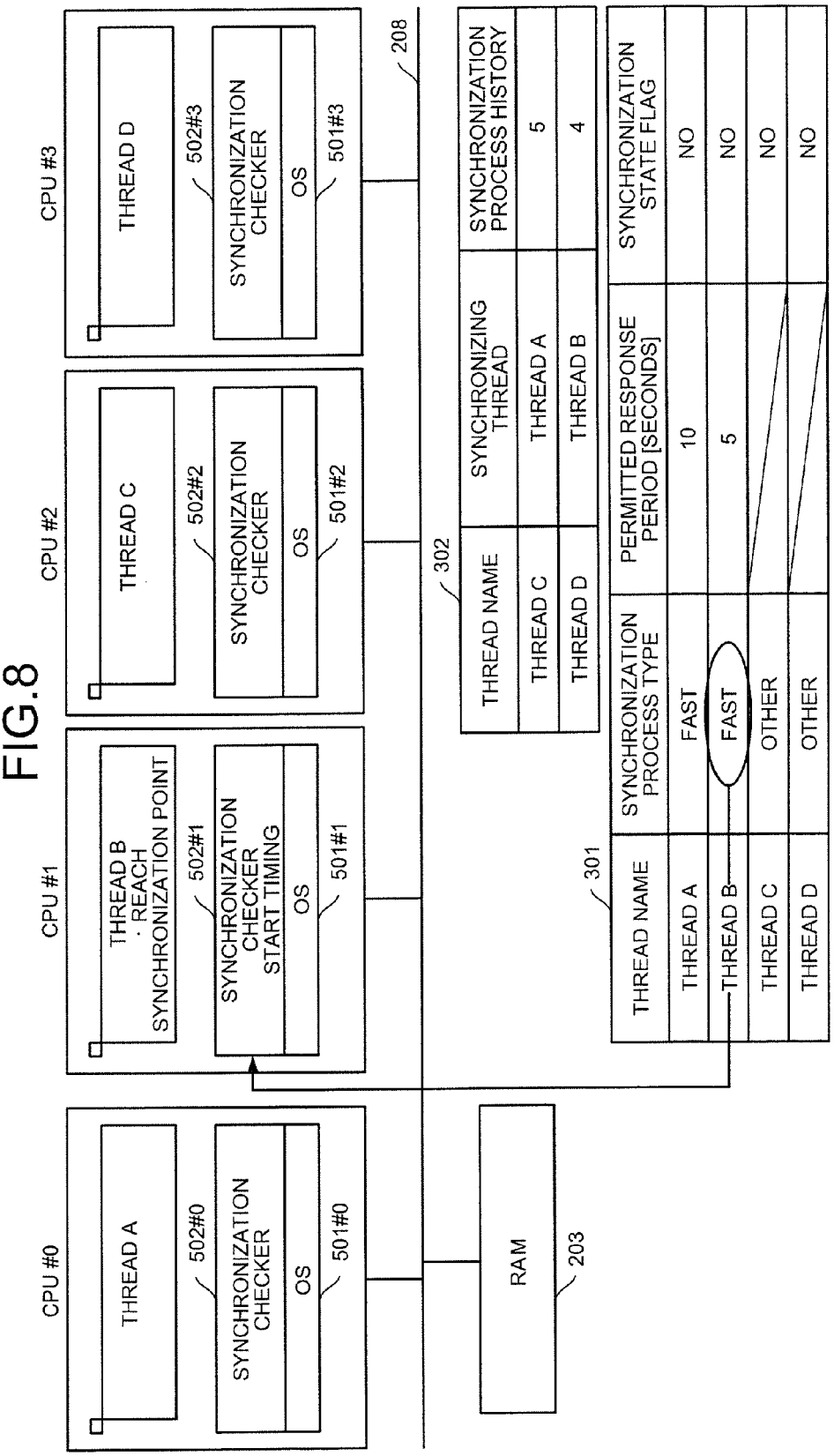
FIG. 8 is a diagram depicting a state in which thread B has reached the synchronization point.

FIG. 8 is a diagram depicting a state in which thread B has reached the synchronization point. When thread B reaches the synchronization point, the synchronization checker 502#1 determines the synchronization process type of thread B. Since the synchronization process type of thread B is "fast", the synchronization checker 502#0 begins measuring the time.

Figure 9:
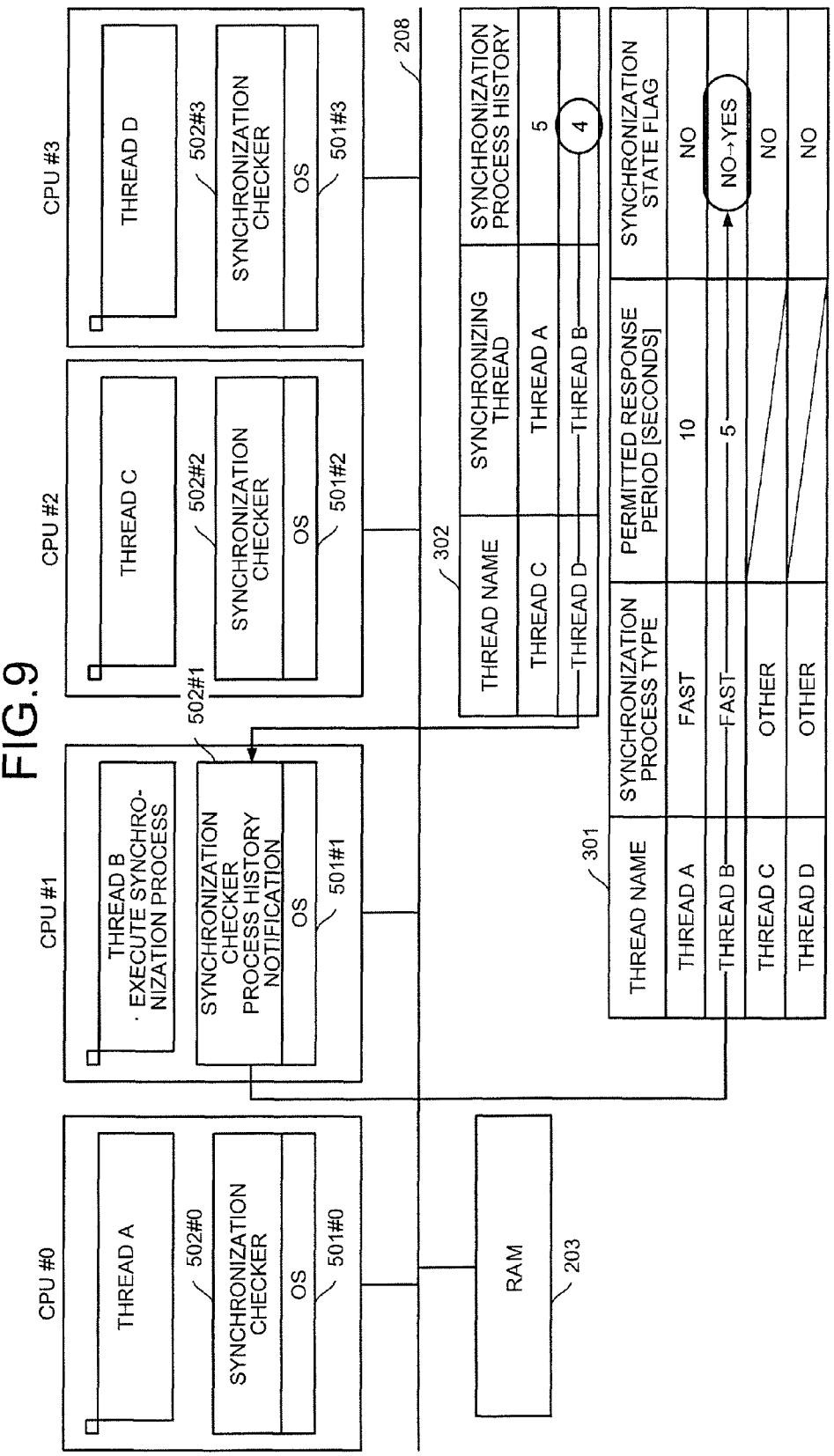
FIG. 9 is a diagram depicting a state in which the permitted response period elapses before thread D reaches the synchronization point.

FIG. 9 is a diagram depicting a state in which the permitted response period elapses before thread D reaches the synchronization point. FIG. 9 depicts a state in which the permitted response period of 5 [seconds] has elapsed since the synchronization checker 502#1 started measuring the time in FIG. 8. Having detected the elapse of the permitted response period, the synchronization checker 502#1 acquires from the synchronization process history of thread D, the past process result, which is "4". Thread B executes the synchronization process with the acquired past process result. After the execution of the synchronization process, the synchronization checker 502#1 changes the synchronization process history of thread B from "NO" to "YES".

FIG. 10 is a diagram depicting a state in which thread D reaches the synchronization point after the permitted response period elapses. FIG. 10 depicts a state in which thread D reaches the synchronization point after thread B has been expedited and executed in FIG. 9. Having detected that thread D has reached the synchronization point, the synchronization checker 502#3 checks the synchronization state flag of thread B, which is a synchronizing thread of thread D. In the example depicted in FIG. 10, since the synchronization point has been reached after the elapse of the permitted response period, the synchronization state flag of thread B is "YES". Having confirmed that the synchronizing thread has performed the synchronization process, the synchronization checker 502#3 causes thread D to skip the synchronization process.

After completion of the synchronization process, the synchronization checker 502#3 sets the synchronization state flag of thread B and the synchronization state flag of thread D to "NO" in preparation for the next execution of the synchronization process. Further, the synchronization checker 502#3 updates the synchronization process history of thread D. In the example depicted in FIG. 10, since the process result of thread D is "6", the synchronization process history of thread D is set to "6".

FIG. 11 is a diagram depicting an application example in the case of multiple users. In the example depicted in FIG. 11, the multicore processor systems 100#A to 100#C are present, and data is communicated via the I/Fs 207. The application program running in the example depicted in FIG. 11 is assumed to be a program having multiple users such as a networked game. The networked game is assumed to be a simulation game, for example. The networked game receives as user data, commands from the users of the multicore processor systems 100#A to 100#C and performs a process corresponding to the user data group.

In the multicore processor system 100#A, threads A to C are present. Thread A performs an acquisition process of acquiring data received via user operation of the keyboard 104 and after the acquisition, performs a display process of processing all of the user data for display on the display 103. Thread B receives data from the multicore processor system 100#B via the I/F 207. Thread C receives data from the multicore processor system 100#C via the I/F 207.

In the example depicted in FIG. 11, thread A acquires user data A via the keyboard 104 and reaches the synchronization point; thread B receives user data B via the I/F 207 and reaches the synchronization point. However, thread C cannot receive user data C consequent to a failure in the line connecting the multicore processor system 100#C and cannot reach the synchronization point. In this state, if the permitted response period of thread A is exceeded, the multicore processor system 100#A uses the acquired user data A, the received user data B, and past user data C stored in the thread synchronization history table 302, and executes the display process.

With a networked game according to a conventional example, if commands cannot be acquired from all of the users, the commands are discarded or the arrival of the thread at the synchronization point is awaited, whereby the response to the user drops. However, if the present embodiment is applied, with respect to commands that cannot be acquired, the networked game can continue processing based on previous commands, enabling the response to the user to be improved.

With reference to FIGS. 12 and 13, a process of the synchronization checker 502, which enables implementation of the operations described with reference to FIGS. 5 to 10, will be described. Although the synchronization checker 502 is executed by all of the CPUs among the CPUs 201, with reference to FIGS. 12 and. 13, description with be given with respect to the synchronization checker 502#0 executed by the CPU #0. Further, the timing at which the synchronization checker 502 is invoked is when threads are assigned to the CPU that executes the synchronization checker 502.

FIG. 12 is a flowchart of a first part of the process performed by the synchronization checker 502. The synchronization checker 502#0 determines whether processing of all threads in the CPU #0 has been completed (step S1201). If the processing of all the threads has been completed (step S1201: YES), the synchronization checker 502#0 ends the process. If a new thread has been invoked in the CPU #0, the synchronization checker 502#0 once again begins the process.

Among the threads, if a thread for which processing has not been completed is present (step S1201: NO), the synchronization checker 502#0 acquires the information of thread under execution (step S1202), and determines whether the thread has reached the synchronization point (step S1203). If the thread has not reached the synchronization point (step S1203: NO), the synchronization checker 502#0 transitions to the operation at step S1201. If the thread has reached the synchronization point (step S1203: YES), the synchronization checker 502#0 confirms the synchronization process type of the thread (step S1204). If the synchronization process type is "other" (step S1204: Other), the synchronization checker 502#0 transitions to the operations in the flowchart depicted in FIG. 13.

If the synchronization process type is "fast" (step S1204: Fast), the synchronization checker 502#0 starts measuring the waiting time using the time at which the synchronization point is reached as a start time of the measuring (step S1205). After starting measurement of the waiting time, the synchronization checker 502#0 determines whether a synchronizing thread of the thread has reached the synchronization point (step S1206).

Whether the synchronizing thread has reached the synchronization point can be determined by checking the synchronization state flag of the synchronizing thread. For example, if the synchronization state flag is "YES", the synchronizing thread has reached the synchronization point and if the synchronization state flag is "NO", the synchronizing thread has not reached the synchronization point. Further, multiple synchronizing threads may be present. In such a case, if all of the synchronizing threads have reached the synchronization point, the synchronization checker 502#0 executes the operation at step S1206: YES. If among the synchronizing threads, 1 or more threads have not reached the synchronization point, the synchronization checker 502#0 executes the operation at step S1206: NO.

If the synchronizing thread has not reached the synchronization point (step S1206: NO), the synchronization checker 502#0 determines whether the waiting time has exceeded the permitted response period (step S1207). If the permitted response period has not been exceeded (step S1207: NO), the synchronization checker 502#0 determines whether frequent keyed input has been received from the user (step S1208). If keyed input is received, for example, a given number of times or more per unit time, set as a reference for determining frequent keyed input, the synchronization checker 502#0 may be set to determine that frequent keyed input has been received.

If frequent keyed input has not been received (step S1208: NO), the synchronization checker 502#0 transitions to the operation at step S1206. If frequent keyed input has been received (step S1208: YES), the synchronization checker 502#0 sets the time at which the time measurement starts until the time when frequent keyed input is received from the user, as a response request period (step S1209). The synchronization checker 502#0 sets a new permitted response period as (response request period+permitted response period)/2 (step S1210), and transitions to the operation at step S1206. In the example depicted in FIG. 12, although the new permitted response period is calculated using the arithmetic average, another averaging method such as a geometric mean, harmonic mean, etc. may be used.

If the waiting period has exceeded the permitted response period (step S1207: YES), the synchronization checker 502#0 requests the thread to execute the synchronization process based on the synchronization process history of the other thread (step S1211). The synchronization checker 502#0 changes the synchronization state flag of the thread to "YES" (step S1212), and transitions to the operation at step S1201.

If the synchronizing thread has reached the synchronization point (step S1206: YES), the synchronization checker 502#0 causes the thread and the synchronizing thread to execute the synchronization process (step S1213). After the execution of the synchronization process, the synchronization checker 502#0 changes the synchronization state flags of the thread and the synchronizing thread to "NO" (step S1214), and transitions to the operation at step S1201.

FIG. 13 is a flowchart of a second part of the process performed by the synchronization checker 502. If the synchronization process type of the thread is "other", the synchronization checker 502#0 determines whether among synchronizing threads, a thread whose synchronization process type is "fast" is present (step S1301). If a thread whose synchronization process type is "fast" is present (step S1301: YES), the synchronization checker 502#0 determines whether among the synchronizing threads whose synchronization process type is "fast", a thread whose synchronization state flag is "YES" is present (step S1302).

Among the synchronizing threads, multiple threads may have a synchronization process type of "fast". In this case, among the threads whose synchronization process type is "fast", if 1 or more threads have a synchronization state flag of "YES", the synchronization checker 502#0 executes the operation at step S1302: YES. If all synchronization state flag indicate "NO", the synchronization checker 502#0 executes the operation at step S1302: NO.

If no thread whose synchronization process type is "fast" is present (step S1301: NO) or if no thread whose synchronization state flag is "YES" is present (step S1302: NO), the synchronization checker 502#0 causes the thread and the synchronizing thread to execute the synchronization process (step S1303).

If a synchronizing thread whose synchronization state flag is "YES" is present (step S1302: YES), the synchronization checker 502#0 instructs the thread to skip the synchronization process (step S1304). Subsequently, the synchronization checker 502#0 determines whether among the synchronizing threads, the synchronization state flag of all the threads, excluding the thread under execution, is "YES" (step S1305).

If excluding the thread under execution, the synchronization state flag of all synchronizing threads is "YES" (step S1305: YES), the synchronization checker 502#0 changes the synchronization state flag of all the synchronizing threads to "NO" (step S1306). If excluding the thread under execution, the synchronization state flag of all synchronizing threads is not "YES" (step S1305: NO), the synchronization checker 502#0 changes the synchronization state flag of the thread under execution to "YES" (step S1307).

After completion of the operations at step S1303, step S1306, and step S1307, the synchronization checker 502#0 stores the process result of the thread under execution to the synchronization process history (step S1308), and transitions to the operation at step S1201.

As described, according to the synchronization method, if a first thread of the first type responding to the user reaches the synchronization point and the arrival of a second thread of the second type synchronizing with the first thread is late, the process history of the second thread is used and the first thread is expedited and executed. As a result, the computer executing the synchronization method can respond quickly to the user, enabling the response to the user to be improved.

Since the history of the second thread is used to expedite and execute the first thread, the synchronization method is particularly effective when the process result of the second thread does not vary greatly from the process history. For example, when a web page is re-read, the process history of the second thread and the process result of the second thread are equivalent if the web page has not been updated and therefore, effects of the synchronization method according to the embodiment are particularly yielded by an application of the synchronization method to a computer.

Concerning the classification of the threads as the first type and the second type, the designer, etc. classifies the threads by level according to whether few problems occur even if the synchronization process among the threads is not performed. As a result, the computer can perform the synchronization process with a thread for which no serious problem occurs and the past process history of a thread that has not reached the synchronization point and executes subsequent processes speculatively, enabling the response to the user to be improved.

If the synchronization method determines whether the permitted response period has elapsed since the time when the first thread reached the synchronization point and if the permitted response period has elapsed, the synchronization method may perform the synchronization process with the first thread and the past process history of the second thread and, expedite the execution of the first thread. As a result, the computer executing the synchronization method can wait for the second thread to reach the synchronization point for a period that does not seem too long to the user.

If a processing request from the user is received, the synchronization method may shorten the permitted response period. As a result, the computer executing the synchronization method can expedite the execution of the first thread when determining that the user feels impatient, enabling the response to the user to be improved.

The synchronization method may perform the synchronization process with the first thread and the past process history of the second thread, and after expediting the execution of the first thread, may set the synchronization state flag of the first thread to a value indicating completion. As a result, the computer executing the synchronization method can determine that when the second thread reaches the synchronization point, the first thread has already completed the synchronization process.

If the synchronization method has performed the synchronization processes of the first thread and the second thread, the synchronization method may set the synchronization state flag of the first thread and the synchronization state flag of the second thread to a value indicating the initial state. As a result, after performing the synchronization method with respect to the first execution of the synchronization process by the first thread and the second thread, the computer executing the synchronization method can apply the synchronization method to the subsequent execution of the synchronization process.

When the type of the synchronization process of the first thread is the second type, the synchronization method may determine the type of the synchronization process of the second thread. As a result, the computer executing the synchronization method can change process contents according to the type of the synchronization process of the second thread.

When the type of the synchronization process of the first thread is the second type, the type of the synchronization process of the second thread is the first type, and the synchronization state flag of the second thread indicates completion, the synchronization method may skip the synchronization processes of the first thread and the second thread. In this case, the second thread has already completed the synchronization process and therefore, the computer executing the synchronization method must omit and skip the synchronization process.

If the type of the synchronization process of the first thread and the type of the synchronization process of the second thread are both the second type, the synchronization method may perform the synchronization processes of the first thread and the second thread. As a result, the computer executing the synchronization method can wait for all the threads to reach the synchronization point and maintain the coherency of the data, if the coherency of the data cannot be maintained without performing the synchronization process.

If the synchronization processes of the first thread and the second thread have been skipped, the synchronization method may set the synchronization state flags of the first thread and the second thread to a value indicating the initial state. As a result, after the first thread and the second thread have performed the synchronization process using the process history, which is a characterizing element of the present synchronization method, the computer executing the synchronization method can apply the synchronization method to the subsequent execution of the synchronization process.

The synchronization method, with respect to a thread whose type of synchronization process is the second type, may store to the synchronization process history of the thread, the process result at the time when the thread reaches the synchronization point. For example, assuming that the type of the synchronization process of the first thread is the first type and the type of the synchronization process of the second thread is the second type, in this case, if the second thread reaches the synchronization point late when the first thread and the second thread perform the synchronization process again after having performed the synchronization process, the first thread can expedite execution of the process thereof by using the synchronization process history of the second thread.

In relation to processing requests from the user, if an input count from an external interface has exceeded a given value, the synchronization method may determine the input to be processing requests from the user. For example, if the user repeatedly hits keys on the keyboard, the computer executing the synchronization method determines the repeated hitting of the keys to be processing requests from the user. A repeated hitting of keys on the keyboard is a behavior performed when the user feels agitated with an operation such as when a web page is not promptly displayed, or when screen transition does not occur. Therefore, the computer executing the synchronization method quickly responds to the user in response to behaviors exhibited when the user feels agitated, thereby enabling further improvement in the response to the user.

The synchronization method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The synchronization method expedites the start of execution of a process that is after the synchronization process and responds to the user, enabling improved response to the user to be effected.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A synchronization method of multiple threads including a first thread and a second thread executed by a processor of a computer, the synchronization method comprising:
   determining a type of a synchronization process that is to be performed by the first thread for synchronizing with the second thread, by referring to a table that stores both information of synchronization process types corresponding to each of the multiple threads executed by the processor and information of permitted response periods corresponding to each of the multiple threads, wherein each of the multiple threads is being executed to perform processing corresponding to a received processing request;
   determining a first synchronization point which occurs at the end of the received processing request for the first thread;
   waiting, by the first thread, at the first synchronization point when the first thread reaches the first synchronization point;
   when the synchronization process that is to be performed by the first thread is determined to be of a first type:
   measuring a time while the first thread waits at the first synchronization point;
   performing the synchronization process of the first thread based on a synchronization process history of the second thread when the measured time exceeds a permitted response period stored in the table that corresponds to the first thread; and
   both updating the permitted response period and performing the synchronization processes of the first thread and the second thread based on the synchronization process history of the second thread, when another processing request is received.

2. The synchronization method according to claim 1, further comprising
   performing the synchronization processes of the first thread and the second thread when the second thread is in a state to perform the synchronization process before the permitted response period elapses.

3. The synchronization method according to claim 1, further comprising
   setting a synchronization state flag of the first thread after performing the synchronization processes of the first thread and the second thread based on the synchronization process history of the second thread.

4. The synchronization method according to claim 2, further comprising
   setting synchronization state flags of the first thread and the second thread to an initial state after performing the synchronization processes of the first thread and the second thread.

5. The synchronization method according to claim 1, further comprising determining the type of the synchronization process of the second thread, when the type of the synchronization process of the first thread is a second type.

6. The synchronization method according to claim 5, further comprising:
   setting a synchronization state flag of the first thread after performing the synchronization processes of the first thread and the second thread, based on the synchronization process history of the second thread, and
   omitting the synchronization processes of the first thread and the second thread, when the type of the synchronization process of the second thread is the first type and a synchronization state flag of the second thread is set.

7. The synchronization method according to claim 5, further comprising
   performing the synchronization processes of the first thread and the second thread, when the type of the synchronization process of the second thread is the second type.

8. The synchronization method according to claim 6, further comprising
   setting synchronization state flags of the first thread and the second thread to an initial state.

9. The synchronization method according to claim 7, further comprising
   storing in synchronization process histories of the first thread and the second thread, process results when the synchronization processes are reached.

10. The synchronization method according to claim 1, further comprising
    detecting the another processing request when an external input count exceeds a given value.

11. The synchronization method according to claim 1, wherein updating the permitted response period comprises shortening the permitted response period.

12. The synchronization method according to claim 1, wherein performing the synchronization process of the first thread and the synchronization process of the second thread are performed after the updated permitted response period has been elapsed.

* * * * *